W. W. MURRAY & J. F. DILLON.
ELECTRICALLY OPERATED MINE DOOR.
APPLICATION FILED JULY 31, 1914.

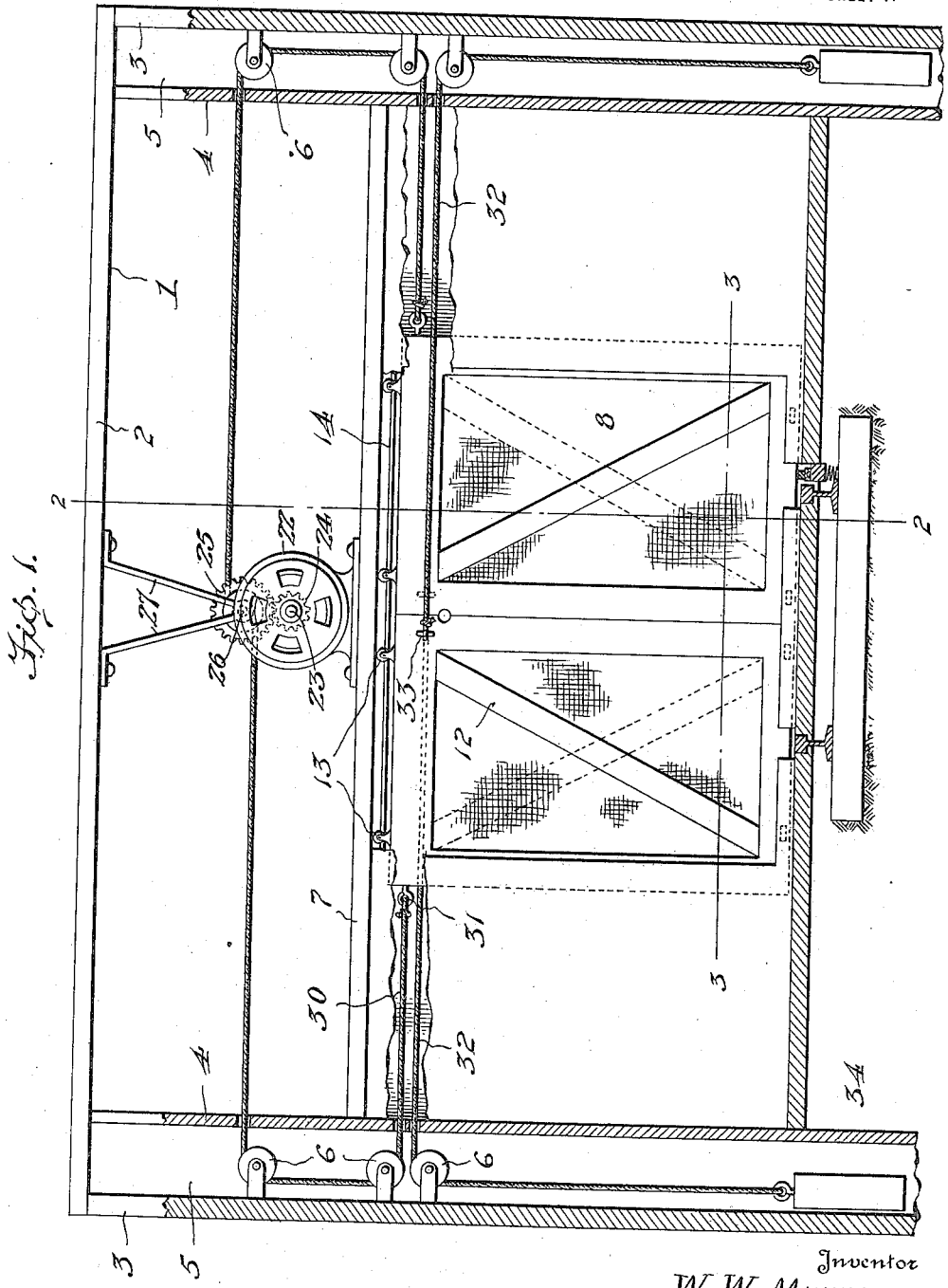

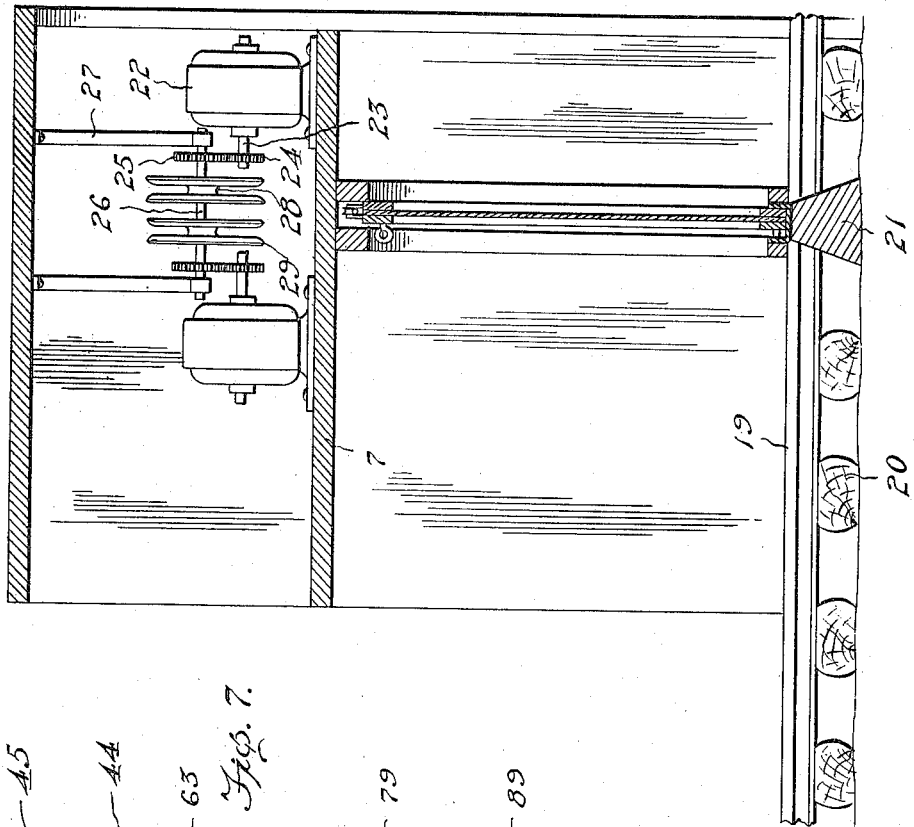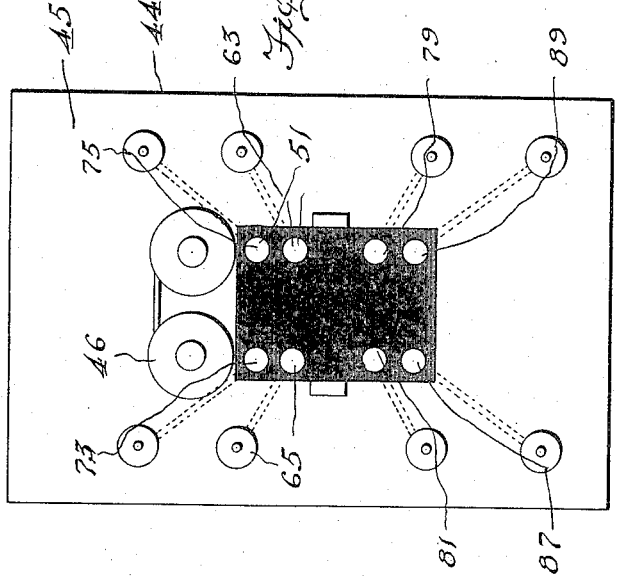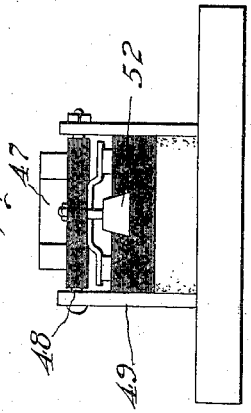

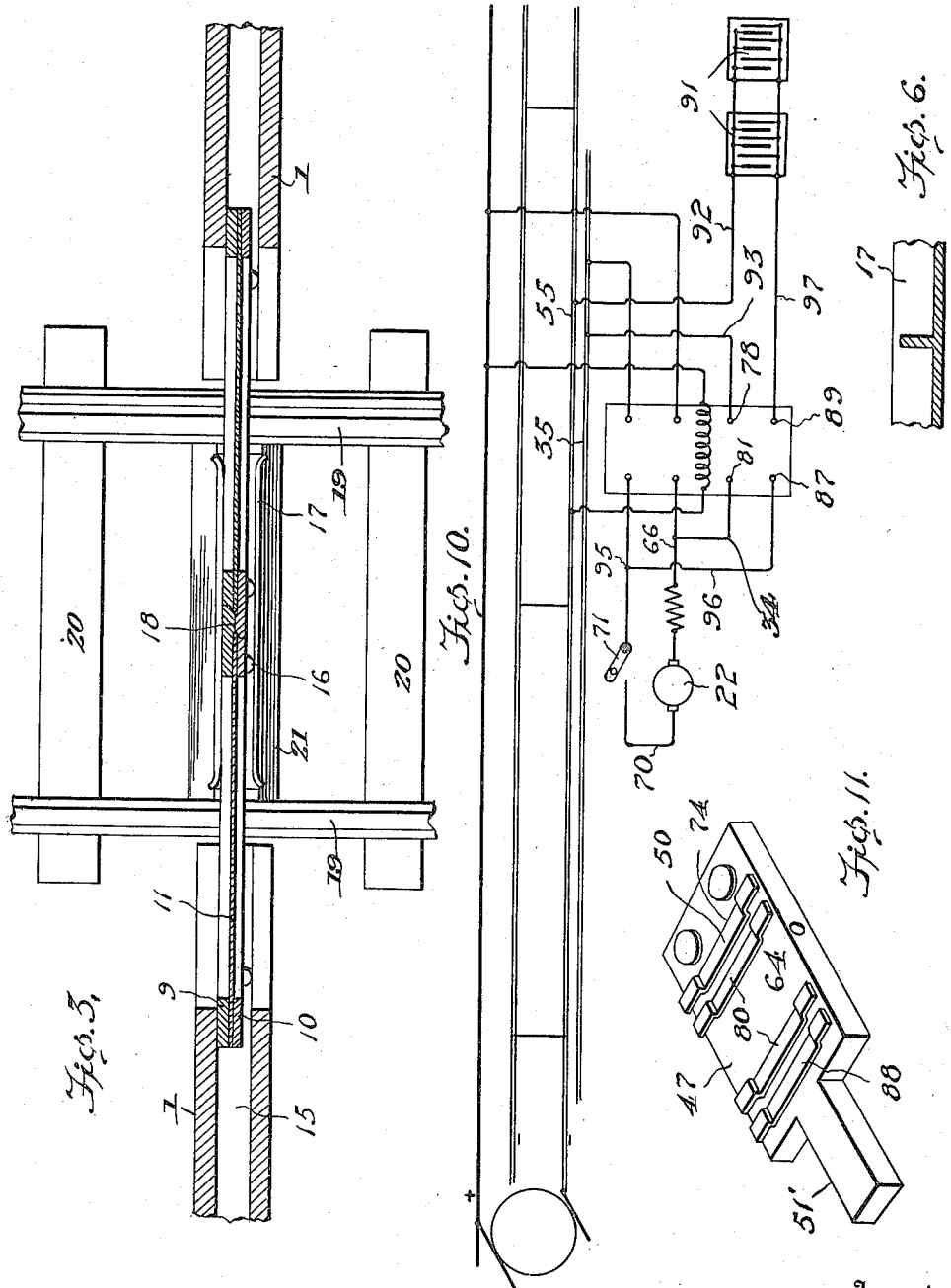

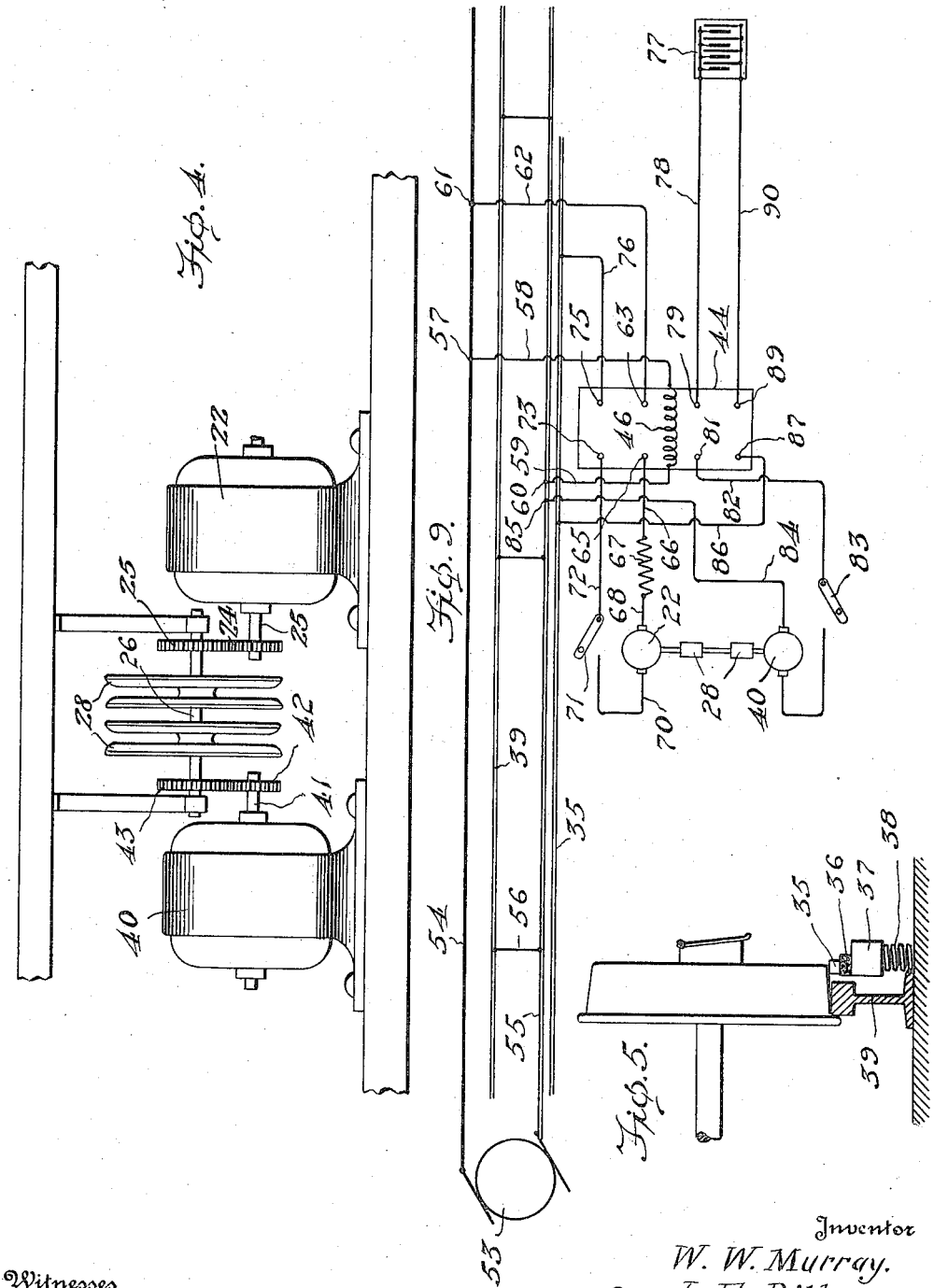

1,145,787.

Patented July 6, 1915.
5 SHEETS—SHEET 5.

Witnesses
Paul M. Hunt

Inventor
W. W. Murray
J. F. Dillon

Attorney

UNITED STATES PATENT OFFICE.

WILLIAM W. MURRAY AND JAMES F. DILLON, OF DEARING, WEST VIRGINIA.

ELECTRICALLY-OPERATED MINE-DOOR.

1,145,787.

Specification of Letters Patent.

Patented July 6, 1915.

Application filed July 31, 1914. Serial No. 854,294.

*To all whom it may concern:*

Be it known that we, WILLIAM W. MURRAY and JAMES F. DILLON, citizens of the United States, residing at Dearing, in the county of McDowell and State of West Virginia, have invented certain new and useful Improvements in Electrically-Operated Mine-Doors; and we do hereby declare the following to be a full, clear, and exact description of the invention, such as will enable others skilled in the art to which it appertains to make and use the same.

This invention relates to new and useful improvements in mine doors, and has for its principal object to provide automatic, electrically operated mine doors which will normally be held closed, but which may be opened upon the approach of a car.

Another object of the invention is to provide a door of the above character which works automatically, thus eliminating the necessity of manual operation.

A further object of the invention is to provide means to control the operation of the door from the main supply of electric current or provide means to control the operation of the door from an auxiliary supply.

Still another object of the invention is to provide an automatic switch which will control the supply of electrical current to the motors which operate the door to insure the proper operation of the door at all times.

A still further object of the invention is to provide mine doors which are substantially airtight, thereby assisting in the ventilation of the mine.

A further object of the invention is to provide a device wherein a relatively weak current may be used to operate the door when so desired.

Figure 12:
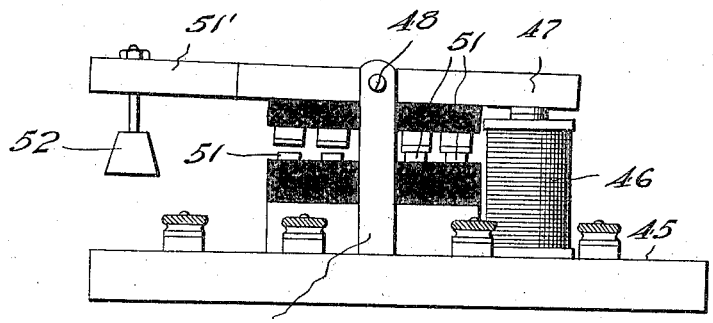
Figure 13:
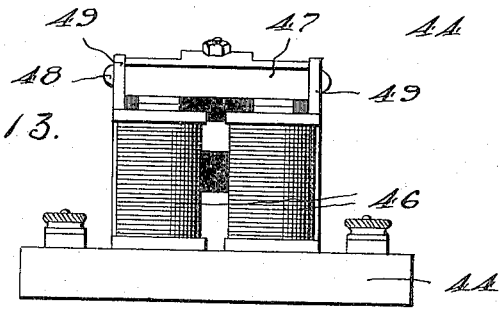
Figure 14:
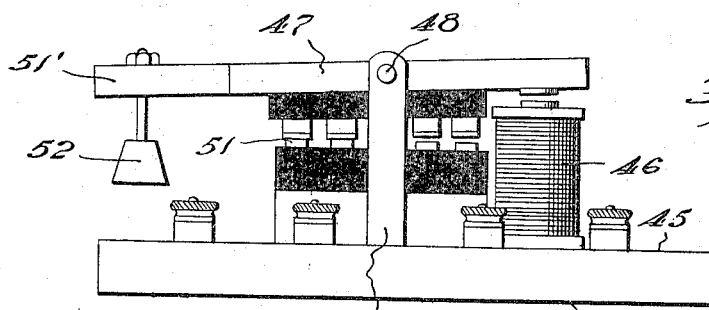
Figure 15:
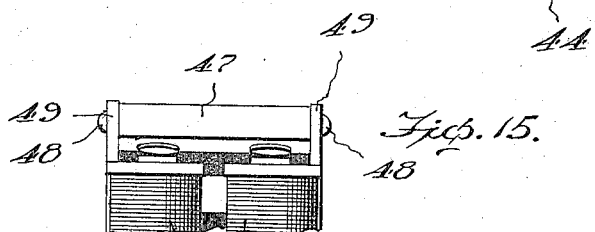

With these and other objects in view, the invention consists in the novel combination and arrangement of parts which will be fully set forth in the following specification and accompanying drawings, in which, Figure 1 is a face view of a pair of mine doors showing the operation means as it would appear when applied thereto, Fig. 2 is a sectional view taken on line 2—2 of Fig. 1, Fig. 3 is a horizontal sectional view taken on line 3—3 of Fig. 1, Fig. 4 is an enlarged detail view of the door controlling motor and gearing therefor, Fig. 5 is an enlarged detail view showing the method of closing the circuit through the motor, Fig. 6 is an enlarged detail sectional view of the guide for the door illustrating the stop which is used in connection therewith, Fig. 7 is a top plan view of the controlling switch showing the armature removed, Fig. 8 is a rear elevation of Fig. 7 showing the armature in place, Fig. 9 is a diagrammatic view of the wiring circuit showing the same using two motors to operate the door, Fig. 10 is a diagrammatic view of the wiring circuit showing the use of one motor to operate the doors, and Fig. 11 is a bottom perspective view of the contact armature. Fig. 12 is a side view in elevation of the controlling switch showing the same in its normal position, Fig. 13 is an end view from the magnet end of Fig. 12, Fig. 14 is a view similar to Fig. 12 showing the device in its operated position, and Fig. 15 is a fragmentary view similar to Fig. 13 showing the switch in its operated position.

Referring now to the drawings by characters of reference, the numeral 1 designates as an entirety the casing of the door comprising the head piece 2 which is supported on the upright 3. Secured to the head piece 2 near the upright 3 is the partition 4 which forms the pocket 5 in which the rollers 6, which control the operation of the doors, are held. A suitable horizontal partition wall 7 is secured between the partitions 4 and said wall 7 is arranged to form the upper guide for the mine doors, which are designated generally by the numeral 8. These mine doors 8 comprise the two separate frames 9 and 10, one of which carries the canvas 11 which forms the closure for the opening formed by the frame. Suitable brace rods 12 are secured within the frames and are arranged to strengthen the same to prevent them from becoming racked or from sagging. Each of these doors is provided at its upper end with suitable hangers 13 which are arranged to coöperate with the track 14 carried by the partition 7 in holding the doors in operative position. Suitable pockets 15 are formed laterally of the door openings and are arranged to receive the doors when slid to their open position. Rotatably mounted on the lower edge of each of the door frames are the rollers 16 which are arranged to take up the friction of the lower edge of the door against the guide 17 which may be formed of channel iron or any suitable material. The abutting edges of the door frames are cut away as at 18 to form a lock joint which will insure the proper engagement of the doors to prevent the escape of air from the interior of the mine.

The track of the mine, which is designated generally by the numeral 19, is supported on the usual ties 20, and one of the ties, which is designated by the numeral 21, is preferably tapered in cross section to support the guide 17 hereinbefore referred to. This tie is so tapered to avoid any danger of the contents of the cars which might fall upon the track, from interfering with the proper operation of the doors.

Having described the detail construction of the doors, and hangers therefor the next in order will be the detailed description of the operating mechanism, which is supported on the partition wall 7 hereinbefore described.

A suitable motor 22 is supported on the partition wall 7 and carries the usual shaft 23 to which the spur gear 24, which meshes with the gear wheel 25, is secured. This gear wheel 25 is carried on the shaft 26 which is supported in the brackets 27 and carries intermediate its ends the winding drums 28, which drums are flared outwardly at their edges as at 29 to insure the proper winding of the rope or cable by means of which the doors are operated. This rope or cable is designated by the numeral 30 and one end thereof is secured at 31 to the door frame. A similar rope or cable 32 is secured to the opposite side of the door frame as at 33 and the opposite end of said rope or cable 32 carries the weight 34 by means of which the doors are normally held in their closed position. It will thus be seen that when the motor is set in motion, the rope or cable will be wound upon the drums, thereby causing the doors to open, and upon releasing the car from the motor and breaking the circuit it will be evident that the doors will again return to their normal closed position through the action of the weight 34. A suitable contact rail 35 is supported on the insulating material 36 which in turn is supported on the blocks 37, and said contact rail is held upwardly by means of the compression coil springs 38 which are placed at suitable intervals to insure the proper contact of the wheel as illustrated in Fig. 5. The rails 39 of the track form the opposite contact point, and it will thus be seen that when the wheels of the cars rest on the rails and on the sub rail 35, the circuit through the motor will be completed, thereby causing the doors to open.

In order to insure the proper operation of the doors at all times, the auxiliary motor 40 is provided and said motor is provided with the usual shaft 41 carrying the spur gear 42, which is arranged to mesh with the spur gear 43 carried by the shaft 26, and it will thus be seen that when the motor 40 is set in operation the shaft will be rotated thereby causing the doors to be operated. It is to be understood that when so desired the auxiliary motor may be eliminated and the main motor driven from the storage battery circuit as will be fully set forth hereinafter. In order to insure the proper operation of the motor there is provided the switch which is designated by the numeral 44. This switch comprises the base plate 45 having secured thereto the electromagnets 46. These electromagnets 46 are arranged to be in circuit with the main line and to normally attract the armature 47 which is pivoted at 48 to the arms 49. This armature carries a plurality of contact plates 50 which are arranged to coöperate with the contact points designated generally by the numeral 51. These contact plates and contact points are arranged in pairs as clearly shown in Figs. 7 and 11 and are arranged to coöperate with each other inclosing the circuit through the various instruments which are in circuit. A suitable extension 51' is formed at the rear end of the armature 47 and is arranged to form a support for the weight 52 which normally tends to draw the armature away from the electromagnets.

Having described the several parts, it now remains to describe in detail the operation.

The electric generator in the power house, which is designated by the numeral 53, is connected in circuit with the overhead trolley wire 54 and the tracks 55. The rails 39 form one of the contacts 55 and said rails are bonded as at 56 to insure the proper contact of the wheels thereto. Secured as at 57 to the trolley wire 54 is the connecting wire 58, the opposite terminal of which is connected to the magnets 46 hereinbefore referred to. The opposite terminal of the magnet is connected by means of the wire 59 to the rail 55 as at 60 and it will thus be seen that the magnets are shunted across the main line, thereby remaining energized until the power is shut off at the power house in which the generator 53 is located. Connected to the trolley wire 54 as at 61 is a suitable wire 62 which is connected at its opposite terminal to the contact 63 which is arranged to be engaged by the contact plate 64 which is carried by the armature and the opposite end of the contact plate is arranged to engage the contact point 65 which is connected by means of the wire 66 to the resistance coil 67, the opposite terminal of which is connected as at 68 to a direct current motor 22 which is of the same voltage as the main line. The opposite terminal of the motor is connected by means of the wire 70 to one terminal of the switch 71, and the opposite terminal of the switch 71 is connected to the wire 72 which in turn is connected at its end in the contact point 73, which is arranged to be engaged by the plate 74 carried by the armature and the opposite terminal of the plate is arranged to engage the contact point 75 which is connected by means of the wire 76 to the rail 35 hereinbefore referred to. It will thus be seen that when the switch 71 is in contact and a car approaches the doors from either direction the wheels of the car will form a contact between the rails 35 and 39 thereby closing the circuit through the motor 22 and causing the doors to be opened. Should the power for any reason become thrown off at the power house it will be evident that the magnet 46 will be deënergized, thereby permitting the weight 52 to draw the armature away from the magnet, thereby throwing the battery circuit which will be described in detail hereinafter, into operation and disconnecting the main line circuit hereinbefore referred to. This battery circuit originates at the power source 77 and passes through the wire 78 to the contact point 79 of the switch 44. This contact point is arranged to be engaged by the plate 80, the opposite terminal of which engages the contact point 81 and causes the circuit to pass through the wire 82, through the switch 83, and into the motor 40. The current then passes from the motor 40 into the wire 84 and to the rail 55 through the contact 85, and when a car bridges the space between the rails 35 and 39 it will be apparent that the current will pass through the wire 86 and into the contact point 87 across the contact plate 88 to the contact point 89 and from thence through the wire 90 to the battery 77 hereinbefore referred to. It will thus be seen that an automatic switch is provided which will effectively control the operation of the doors regardless of whether the main line circuit or the auxiliary circuit is used.

In order to eliminate the necessity of the use of a second motor, the wiring circuit which is illustrated in Fig. 10 is used, and a plurality of storage batteries of greater strength are provided. In this construction the wiring system is substantially the same as that previously described with the exception of the change in the battery circuit which will be described in detail as follows: As soon as the current from the power house is discontinued, the weight 52 will draw the armature downwardly so that the contact points 78 and 81, 87 and 89 will be in contact with their respective plates 80 and 88, thus causing the circuit to pass from the batteries 91 through the wire 92, and to the rail 55. When a car forms a contact it will be apparent that the current will pass through the car wheel into the rail 35 and through the wire 93 into the contact point 78 from which it passes through the contact plate 80 to the contact point 81 from whence it passes through the wire 94 into the wire 66 and thence through the main motor 22 through the wire 70 and switch 71, to the junction 95 of the wire 96, thence through the contact point 87 to the contact point 89 through the bar 88, from whence it passes through the wire 97 to the power source 91 hereinbefore referred to. It will thus be seen that there is provided a simple and effective means for using either the original or an auxiliary motor and a simple and effective mine-door-controlling mechanism is provided which will effectively hold the doors open during the passage of a car therethrough.

A brief description of the operation of the device will be given in the following paragraph.

It will be evident from the foregoing that when this improved mine door is used, a car traveling along the rails will engage the rail 35, thereby causing a contact to be formed between the rail 35 and the rail 39 which will permit the current to flow from the main trolley wire 54 through the wire 62, the switch 44, and thence to the motor 22. The current is then turned through the wire 72 and switch 44, the wire 76 and to the rail 35, thence to the car wheel and the rail 39 back to the power source. Should the power at the power source 53 give out for any reason it will be apparent that the weight 52 of the switch 44 will cause the armature to rock back due to the deënergization of the magnet 46, and upon its rearward movement it will be apparent that the circuit will be formed through the contact points 79, 81, 87 and 89 of the sub circuit which is generally in the battery 77. It will thus be seen that the current will pass from the battery into the wire 78, switch 44, wire 82, to the motor 40, from whence it will pass through the wire 84 to the rail 39, and thence through the car wheel to the rail 35, and through the wire 86 to the switch 44, thence back to the wire 90 to the power source. It will thus be seen that when a car approaches the door from either side, the circuit will be closed through the motor whether the main motor or the sub motor be used, and the door will thereby be opened. Upon the passage of the car beyond the rail 55, it will be evident that the weights will settle to their normal position and thereby draw the doors into their closed position, thus preventing the escaping of any air from the mine tunnel and preventing the air from fouling therein.

While in the foregoing there has been shown and described the preferred embodiment of this invention, it is to be understood that such changes may be made in the combination and arrangement of parts as will fall within the spirit and scope of the invention as defined in the appended claims.

Having thus described our invention, we claim:

1. The combination with a mine door, means to actuate the door, auxiliary means connected to the door-actuating means, and arranged to actuate the door, a switch arranged to normally keep the main door-actuating means in operative relation, and also arranged to automatically cut out the main door-operating means and throw in the auxiliary door-operating means should the main door-operating means become inoperative.

2. In combination, a mine door, a normally opened main electric circuit, a normally opened auxiliary electric circuit, a source of power supply for the main circuit, a door opening means included in said circuits, a source of power supply for the auxiliary circuit, means for automatically connecting the auxiliary circuit with its source of power supply should the source of power supply on the main circuit be interrupted, and a car-operated means for closing the live circuit.

3. The combination with a mine door of electrical means to open the door, means connecting the electrical means with a main power supply, contacting elements closing the circuit through the door controlling means upon the approach of a car to the door opening, and auxiliary electrical means controlling the opening of the door, an auxiliary power supply to feed the auxiliary means, and automatic means in both circuits and controlled from the main circuit whereby when the power through the main circuit is interrupted, the auxiliary circuit will be automatically cut in.

4. The combination with a mine door, a normally opened electrical circuit, a normally opened auxiliary electrical circuit, a separate power source for each circuit, a door opening means included in the main circuit, a door opening means in the auxiliary circuit, an automatic switch normally holding the main circuit cut in, said switch being controlled by the main circuit, means carried by the switch to cut in the auxiliary circuit, and cut out the main circuit should the power supply be cut off from the main circuit, and car-actuated means for automatically closing the circuit upon the approach of a mine car toward the door.

5. The combination with a mine door, a main electrical circuit, a main power supply in said circuit, and a main door opening means included in the circuit, of an auxiliary circuit, an auxiliary power supply in the auxiliary circuit, a door-opening means in the auxiliary circuit, means adapted to automatically cut in the auxiliary circuit should the power on the main circuit cease, and car-controlled means to close one or the other circuit according to the position of the cutting in means.

6. The combination with a mine door, a main electrical circuit, a main power supply in said circuit, and a door-opening means included in the circuit, of an auxiliary circuit, an auxiliary power supply in the auxiliary circuit, a door-opening means in the auxiliary circuit, an electrically operated double throw switch, one pole of which is connected in the main circuit, while the other pole is connected in the auxiliary circuit, electrical means controlled from the main circuit to hold the switch in such a position that the main circuit is cut in, means to throw the switch to the opposite side should the source of supply through the main circuit cease and thereby cut in the auxiliary circuit, and automatic circuit-closing means operated upon the approach of a mine car toward the door.

In testimony whereof we affix our signatures in presence of two witnesses.

WILLIAM W. MURRAY.
JAMES F. DILLON.

Witnesses:
B. G. CHAPMAN,
JOHN A. MURPHY.

Copies of this patent may be obtained for five cents each, by addressing the "Commissioner of Patents, Washington, D. C."